UNITED STATES PATENT OFFICE.

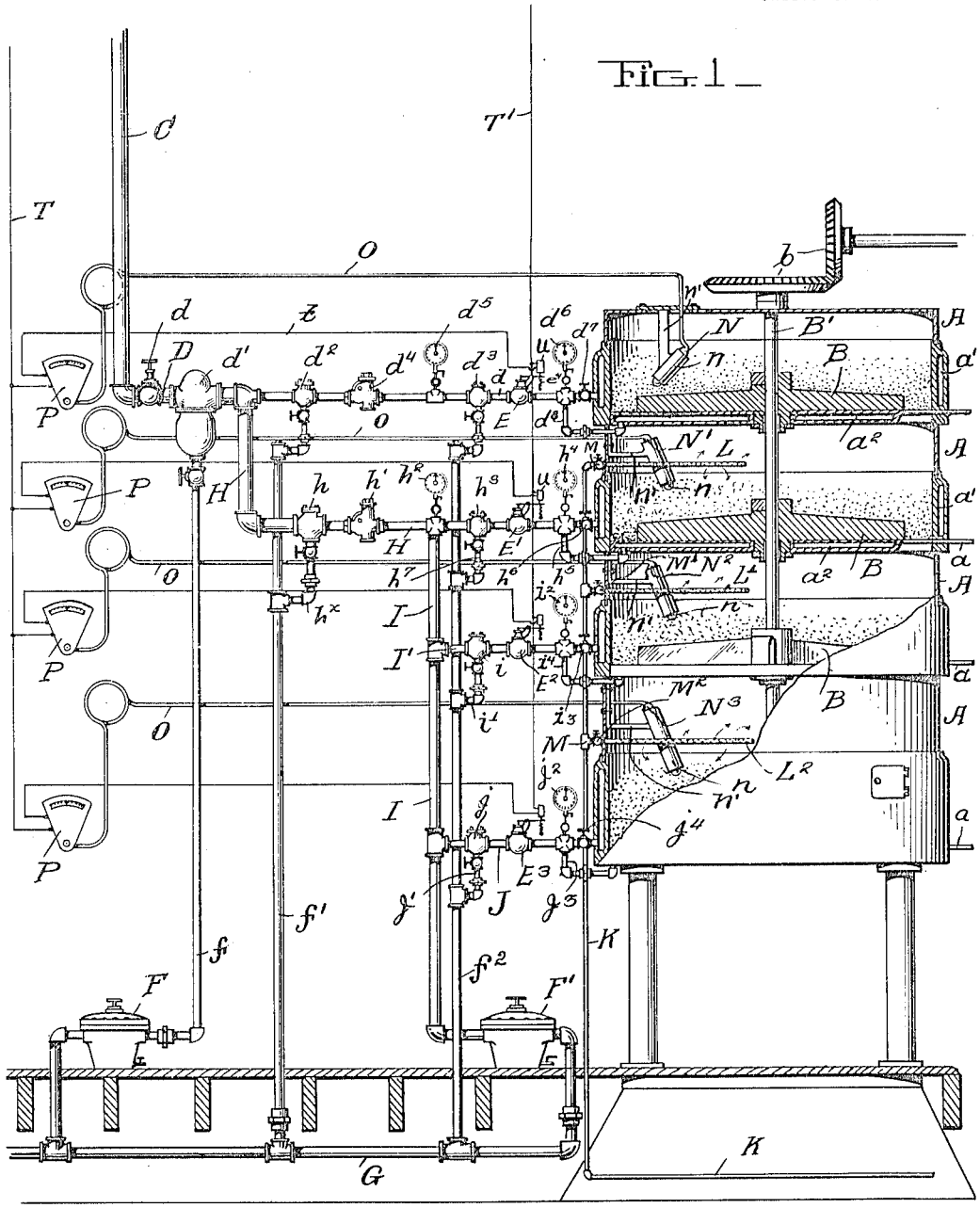

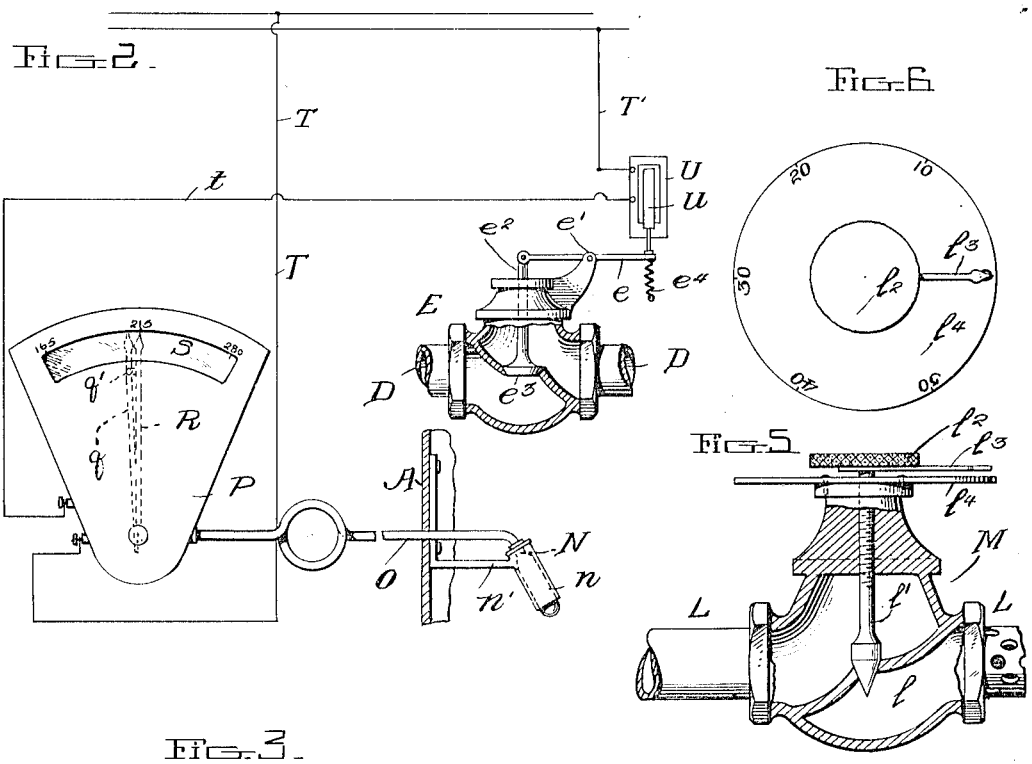

HARRIS T. FRYANT, OF MEMPHIS, TENNESSEE, AND WILLIAM R. CROUT, OF HAZLEHURST, MISSISSIPPI.

COOKER FOR SEED-MEATS.

1,309,595.  Specification of Letters Patent.  Patented July 8, 1919.

Application filed May 3, 1918. Serial No. 232,242.

*To all whom it may concern:*

Be it known that we, HARRIS T. FRYANT and WILLIAM R. CROUT, both citizens of the United States, and residing, respectively, at Memphis, in the county of Shelby and State of Tennessee, and at Hazlehurst, in the county of Copiah and State of Mississippi, have invented certain new and useful Improvements in Cookers for Seed-Meats, of which the following is a specification.

This invention relates to cookers of the kind commonly employed for cooking seed meats, such as the meats of cotton seed, preparatory to the extraction of the oil therefrom.

In the extraction of oils from seed meats, in order to obtain the best quality and the greatest quantity of oil, it is important that due regard should be given, during the process, to the time allowed for the cooking, the temperature of the meats while being cooked, and the amount of moisture contained in the meats while being thus treated. The meats supplied to the cooker usually contain a sufficient amount of moisture to commence the cooking operation, but as this operation progresses the amount of moisture is often so decreased that, in order to obtain the best results, it is necessary that moisture be added in proper amounts, due regard being had to the temperature of the meats in the different stages of the process.

Efficient means have heretofore been furnished for automatically regulating the time allowed for the cooking operation and means have been suggested for regulating the temperature and the amount of moisture in the meats while being treated, but, so far as we are aware, no efficient means have been produced which will automatically so regulate the temperature as to prevent the meats from being over or under cooked, the pressure reducing valves heretofore used for this purpose not having been found entirely accurate in actual service.

It has been a common practice to regulate, to some extent, the amount of moisture in the meats by adding irregular quantities of water to the mass of meats under treatment or by introducing steam in the cooking kettles, but such treatment has also been found to be inadequate as heretofore no proper care has been taken to control the amount of moisture added to the meats in connection with an automatic control of the temperature of the meats while being cooked.

According to our invention we provide means for regulating the temperature of the meats of such nature that the supply of the heating medium is automatically regulated in such a way that the desired temperature may be maintained under all conditions, and we also provide means whereby moisture may be added when required in definite amounts to maintain the required amount of moisture in each mass of meats under treatment.

We preferably embody our invention in a cooker of the kind in which a vertical series of kettles are arranged one above the other, the bottom kettle being provided with a discharge opening delivering to a suitable receiver, while the others are provided with discharge openings equipped with gates which are automatically controlled in such manner that the meats after being cooked for a definite time in one kettle are discharged automatically into the next kettle in the series below it, there cooked for a definite time and after having passed through the series being automatically discharged into a suitable receiver.

Our invention does not contemplate any novel means for controlling the time for the cooking operation nor does it involve any improvements in the mechanism for operating the gates of the several kettles, but it does involve novel mechanism for automatically controlling the temperature of the meats and novel means for introducing moisture into the masses of meats while being cooked.

In order to accomplish our purposes we provide thermostatic devices for operating valves controlling the supply of the heating medium to the kettles. Such thermostatic devices have sensitive parts arranged in the meats-containing portions of the kettles which come in direct contact with the meats while they are being moved or stirred in the kettles. When the temperature rises or tends to rise to too great an extent the thermostatic devices bring into operation electromagnetic devices which shut off the supply of the heating medium. When the temperature falls to a sufficient extent the electromagnetic devices are released and the supply of the heating medium is continued. The thermostatic devices are so constructed that they may be set so as to accurately control the supply of the heating medium whereby it may be admitted or cut off at any determined degree of temperature.

For supplying moisture to the meats we provide a pipe system having branches extending into the kettles and equipped with valves having indexes by means of which the supply of moisture to the meats may be accurately controlled. Other features of our invention will be hereinafter described.

In the accompanying drawings:—

Figure 1 is a view of a seed meats cooker equipped with our improvements. The kettles are for the most part shown in section, and the devices for automatically regulating the supply of the heating medium and the moisture supplying means are shown diagrammatically.

Fig. 2 shows diagrammatically how the valves of the steam supply pipes are controlled and operated by thermostatic and electromagnetic devices.

Fig. 3 is a view on an enlarged scale of a portion of the thermostatic devices.

Fig. 4 is a sectional view thereof.

Fig. 5 is a view mainly in section of one of the valves for admitting moisture to the kettles.

Fig. 6 is a detail plan view of the graduated plate forming part of this valve.

Our improvements are shown applied to a cooker of well known construction. We have illustrated a vertical series of kettles A, four being shown, arranged one above the other. The seed meats are supplied to the top kettle in any suitable way and discharged from the lowermost kettle in the usual manner. Each kettle is provided with a door or gate $a$ which may be operated by hand or automatically by well known mechanism. Each kettle is jacketed, as shown, at $a'$, $a^2$ to provide steam spaces for heating purposes, and each kettle contains a rotary agitator or stirrer B carried by a shaft B' operated by suitable gearing $b$.

Steam is supplied by the pipe C and is conveyed by branch pipes to the several kettles. The uppermost kettle is supplied by a branch pipe D, having a stop valve $d$ and being also equipped with a separator $d'$, strainers $d^2$, $d^3$, a pressure reducing valve $d^4$, steam gages $d^5$, $d^6$, a stop valve $d^7$ and an automatic control valve E. The separator $d'$ is connected by means of a pipe $f$ with a trap F, in turn connected with a blow-out pipe G. The strainers $d^2$, $d^3$ are connected with the blowoff pipe G by pipes $f'$, $f^2$. The pipe D is connected directly with the steam space $a'$ of the first kettle in the series, while a branch pipe $d^8$ extends from the pipe D to the steam space $a^2$ of said kettle. The separator $d'$ removes moisture from the steam and the strainers remove scale, etc., therefrom. The pressure reducing valve is of the usual kind and regulates within certain limits the pressure of the steam in the kettle. The gages shown operate in the usual way, while the valve E is an automatic valve operated in the manner hereinafter described for controlling the admission of steam to the kettle.

The devices above described are contained in the connection between the main steam supply pipe C and the upper kettle in the series. For supplying steam to the next kettle a pipe H is led from the pipe D and connects with the steam spaces of the kettle in the manner shown which is obvious from an inspection of the drawings. The pipe H is equipped with a strainer $h$ connected by a pipe $h^x$ with the pipe $f'$, a pressure reducing valve $h'$, a steam gage $h^2$, a strainer $h^3$, a control valve E', a gage $h^4$, a pipe $h^5$ leading to the steam space $a^2$ and a valve $h^6$. The third kettle is supplied by a pipe I, connected with the branch pipe H and having a branch I' equipped with a strainer $i$, connected at $i'$ with the pipe $f^2$ and said pipe I' is also equipped with a valve $E^2$ similar to valve E before mentioned, a pressure gage $i^2$ and a valve $i^3$. It also has a branch pipe $i^4$ similar to the pipe $d^8$ above referred to. The pipe I also connects with a trap F' similar to the trap F. Steam is supplied to the fourth kettle by means of a pipe J connected with the pipe I and equipped with a strainer $j$, connected at $j'$ with the pipe $f^2$, and said pipe J is also equipped with a valve $E^3$ similar to the valve E before mentioned and with a pressure gage $j^2$, a branch pipe $j^3$ and a valve $j^4$. The manner in which the steam passing through the valves E, E', $E^2$, $E^3$ is relieved of moisture and other foreign matter will, it is thought, be understood without further description. It is also apparent that the supply of steam to the several kettles is under such control that the pressure and consequently the temperature of the kettles may be separately regulated or is separately controlled. The manner in which the temperature is automatically controlled will be hereinafter described. The proper degree of moisture is maintained in the masses of meats in the several kettles by the devices next to be described.

K indicates a pipe for supplying water, preferably hot water at a temperature of say 335° F. This pipe K is provided with perforated branch pipes L, L', $L^2$, three being shown for supplying moisture to the second, third and fourth kettles in the series, it not being necessary ordinarily to supply moisture to the first kettle as the meats supplied to the first kettle usually have a proper percentage of moisture for the first stage of the cooking. Each branch pipe is equipped with a valve M, M', $M^2$ preferably of the kind illustrated in Figs. 5 and 6. As there shown the valve is of the needle type, having a valve chamber $l$, a valve stem $l'$ and a handle $l^2$. The handle carries a pointer $l^3$ operating over a graduated disk or plate $l^4$, the arrangement being such that any desired percentage of moisture may be admitted to a kettle when needed. The operation of admitting moisture in the form of hot water to the kettles is not automatic but the valves are hand-operated. It can usually be determined by testing the meats delivered from the cooker whether or not a sufficient amount of moisture has been contained in the meats while passing through the several kettles. It is also sometimes necessary to separately test the amount of moisture in the meats in the several kettles, and samples of the meats in the separate kettles may be taken and tested, and different amounts of moisture added to the kettles in accordance with their needs. It will be understood that the masses of meats are moved in a circular path by the stirrers B which rotate with the shaft B', and the moisture supplied to the meats is thoroughly distributed therein.

One of the most important parts of the cooking operation is the regulation of the temperature of the meats while under treatment. Pressure reducing valves have heretofore been usually relied upon to regulate within certain limits the temperature but these are arbitrarily set to correspond with certain predetermined temperatures and while they operate fairly well under some conditions they are not sufficient for all purposes inasmuch as the temperature of the meats varies in accordance with many conditions, largely depending upon the amount of moisture which they contain, and one of the most important features of our invention is the provision of means for automatically controlling with great exactness the temperature of the meats while under treatment. For this purpose we provide a thermostatic device, which in turn controls electromagnetic devices that operate a supply valve for each kettle. The thermostatic device may be so adjusted that it will cause the electromagnetic devices to entirely shut off the supply of steam to a cooker when the temperature reaches a predetermined point and when the temperature falls below such predetermined point the valve is automatically opened to admit the heating medium to the kettle. While we do not wish to limit ourselves to the precise construction of the thermostatic and electromagnetic devices employed for the purposes above mentioned, we have illustrated appliances which we have found useful for the purpose and which will now be described.

Each kettle is equipped with a bulb N. N', $N^2$ or $N^3$ which contains mercury. The bulb is supported in a casing $n$ attached to a bracket $n'$. The casing not only supports the bulb but protects it and holds the lower end of the bulb in the meats-containing portion of the kettle so that as the mass of meats is revolved by the stirrers or arms B all portions of the mass will come in contact with the bulb. Each bulb is held at an angle, as shown, in order that the meats may pass it easily and yet come in contact with that portion of the bulb projecting from its casing or jacket and impart their temperature to the bulb in such manner as to operate the thermostatic devices at the proper time. Each bulb is connected by a pipe or tube O with a casing P containing thermostatic devices for closing an electric circuit. As shown, the casing P contains a metallic pipe Q in the form of a spiral and to which is connected a pointer or index arm $q$. When the temperature acting on the bulb N rises the mercury is expanded and gas or liquid contained in the pipe O is also expanded and causes the spiral tube Q to expand, twist or turn in such manner as to turn the pointer $q$. Said pointer $q$ coöperates with another pointer R which is pivotally connected with the casing P and its upper end coöperates with a scale S. The pointer $q$ carries a contact $q'$ which is adapted to engage the pointer R when said pointer $q$ is moved into close proximity to the pointer R. The pointers $q$ and R in the several casings shown are electrically connected with the line wires T, T'. The connections for the several thermostatic devices P are substantially the same. That for the first device in the series may be easily traced. A current entering at T passes to the index finger or pointer $q$ and if this pointer be so moved as to bring the contact $q'$ into engagement with the pointer R the circuit will be closed and will then extend from the pointer R by way of the wire $t$ to the electromagnetic valve operating devices E and thence out through the line wire T'. It is thought to be unnecessary to trace the other circuits illustrated as this can be easily done from an inspection of the drawings.

Referring particularly to Fig. 2 it will be observed that the circuit is from wire T to the thermostatic devices P, thence by wire $t$ to the electromagnetic devices controlling the valve E, and thence the current passes by the wire T' to line. U indicates a solenoid magnet of well known construction, its core $u$ in this instance being connected to a lever $e$, pivoted at $e'$ to the valve casing and connected to the valve stem $e^2$. The valve $e^3$ controls the passage of steam through the pipe D. Fig. 2 shows the valve in its closed position and the pointer $q$ is in contact with the pointer R and the circuit is closed, so that steam is shut off from the kettle with which the valve is associated. When the temperature falls the pointer $q$ moves away from the pointer R and the circuit is broken and the valve $e^3$ is opened in any suitable way, as by means of a spring $e^4$. The devices shown and described are merely examples of other valve mechanism and thermostatic devices which might, with success, be employed for a similar purpose. It will be understood that the thermostatic devices and automatic valves for the other kettles operate in a similar way to that above described but that each kettle is equipped with its own thermostatic and electromagnetic devices. This is of importance because while the temperature of the meats in one kettle may be correct for the best results that in another kettle may be either too high or too low. Ordinarily when this has been the case the attendant must regulate the temperature by manipulation of suitable valves, but by our apparatus such regulation is made automatic.

Each pointer R is provided with a handle $r$ by means of which it may be set to indicate any desired degree of temperature on the scale S and when the pointer $q$ comes in contact with the pointer R the steam supply will be shut off. This will occur when the meats reach a temperature corresponding with that indicated on the scale of the thermostat. The steam entering the second, third and fourth kettles in the series is of less pressure than that entering the first kettle, this being done only to relieve the system of an unnecessarily high pressure as 40 to 50 pounds pressure will easily produce the necessary temperature after the meats have passed the first stage.

By our improvements we are able to not only regulate automatically the temperature of the meats, which depends largely on the amount of moisture which they contain, but we are able to supply to the kettles when necessary any required amount of moisture, and the time of cooking is automatically controlled in the usual way by mechanism now in extensive use.

In the old systems of cooking where reducing or regulating valves were depended upon the temperature could only be regulated by changing the reducing valves to provide either a higher or a lower pressure thus creating more or less heat in the kettle. If the pressure was too high the meats were burned and if too low they were in a raw or uncooked state. In either case the yield of oil was greatly reduced. The time that the seed meats remain in the cooker should be fixed while the temperature and the amount of moisture contained in the meats should be regulated.

If the raw seed contains sufficient moisture to properly cook them at the proper temperature it is unnecessary to add more moisture but in most cases the seeds do not contain sufficient moisture to finish the cooking operation and more moisture must be added. For instance, assuming that the meats contain at the start 8% of moisture and while they are being heated to the cooking temperature this 8% is evaporated in 20 minutes (which is about one-half the time they must remain in the cooker), then they surely will be burned or scorched during the other 20 minutes of the cooking operation unless the heating medium is entirely shut off.

In cooking systems heretofore used no provision has been made to add moisture at the proper times and the temperature has not been properly controlled thus making it practically impossible to obtain the highest possible extraction. In the old systems if the operator happened to set the reducing valves properly and the seed contained the proper amount of moisture very good results were obtained but this was a hit-and-miss proposition, while by our improvements the regulation of the temperature is automatic and exact.

As before intimated, in a cooker of the kind illustrated about forty minutes is allowed for the entire cooking operation and the cooking temperature is usually about 235° F. at the finish. When this is the case the moisture must not be cooked out or evaporated before the forty minutes has expired in order to avoid getting a burned product. It seldom happens that the seed meats contain enough moisture to maintain a sufficient amount in the different stages of the operation until the meats are properly cooked and moisture must be added. To determine how much moisture to add the seed meats passing through the mill preparatory to entering the cooker may be tested to ascertain what percentage of moisture they contain and then if necessary an additional amount of moisture can be added. If for instance, the meats contain 8% and the necessary amount of moisture at the start should be 25%, then 6% of moisture must be added to each stage after the first 8% has been cooked off or evaporated. The admission of the additional moisture is controlled through the valve mechanism above specified and which is illustrated particularly in Figs. 5 and 6 of the drawings. As there shown, the dial or graduated disk is marked from 0 to 50 and to control the admission of moisture added the pointer may be set in such manner as to control the position of the valve to admit more or less water or moisture.

As a whole, therefore, it will be understood that provision is made for controlling the three essential features of processes of this kind, namely, the time allowed for cooking, the amount of moisture which the seed meats contain while being treated and the temperature of the seed meats at each stage of the operation.

We claim as our invention:

1. A cooker for seed meats, comprising a series of kettles arranged one above the other and delivering the one to the other, each of which is provided with means for heating it and each of which is equipped with separately operated thermostatic appliances for automatically shutting off the supply of the heating medium when the temperature of the kettle rises above a predetermined degree, and valve controlled means for separately controlling the supply of moisture to the several kettles.

2. A cooker for seed meats, comprising a kettle having a steam jacket, a pipe for supplying steam thereto, a valve in said pipe for controlling the steam supply, a thermostatic valve-operating appliance having a sensitive part extending into the meats-containing part of said kettle, and means for moving the meats past said sensitive part.

3. A cooker for seed meats, comprising a series of kettles arranged one above the other and delivering the one to the other, each of which is steam jacketed, a steam supply for said kettles, a valve controlling the supply of steam to each kettle, electromagnetic devices for separately operating each valve, a thermostatic appliance for separately closing the circuit of each of said electromagnetic devices and which has a sensitive part extending into a kettle, and means for moving the meats in each kettle past the sensitive part of the thermostatic appliance in each kettle.

In testimony whereof, we have hereunto subscribed our names.

HARRIS T. FRYANT.
WILLIAM R. CROUT.